United States Patent
Kim et al.

(10) Patent No.: US 10,327,028 B2
(45) Date of Patent: Jun. 18, 2019

(54) NETWORK VIDEO RECORDER FOR MULTI-STREAM RECORDING ENHANCED EVENT STREAM DELAY PROBLEM

(71) Applicant: IDIS CO., LTD., Daejeon-si (KR)

(72) Inventors: Jung Min Kim, Seoul (KR); Jeong Ho Lee, Seoul (KR); Jin Hui Park, Seongnam-si (KR)

(73) Assignee: IDIS Co., Ltd., Daejeon-si (KR)

( * ) Notice: Subject to any disclaimer, the term of this patent is extended or adjusted under 35 U.S.C. 154(b) by 92 days.

(21) Appl. No.: 15/805,455

(22) Filed: Nov. 7, 2017

(65) Prior Publication Data
US 2018/0131987 A1    May 10, 2018

(30) Foreign Application Priority Data
Nov. 7, 2016 (KR) ........................ 10-2016-0147408

(51) Int. Cl.
| | | |
|---|---|---|
| *H04N 21/2747* | (2011.01) | |
| *H04N 21/231* | (2011.01) | |
| *H04N 21/6587* | (2011.01) | |
| *H04N 7/18* | (2006.01) | |
| *G08B 13/196* | (2006.01) | |

(52) U.S. Cl.
CPC ........... *H04N 21/2747* (2013.01); *H04N 7/18* (2013.01); *H04N 21/23113* (2013.01); *H04N 21/6587* (2013.01); *G08B 13/196* (2013.01)

(58) Field of Classification Search
None
See application file for complete search history.

(56) References Cited

U.S. PATENT DOCUMENTS

2010/0142918 A1*  6/2010  Cho ..................... G11B 15/026
                                                                386/291
2013/0156400 A1*  6/2013  Kummer ................ H04N 5/782
                                                                386/241

FOREIGN PATENT DOCUMENTS

| JP | 2002-374484 A | 12/2002 |
| KR | 10-2007-0030017 A | 3/2007 |
| KR | 10-0783561 B1 | 12/2007 |
| KR | 10-1660508 B1 | 9/2016 |

OTHER PUBLICATIONS

Korean Notice of Allowance dated Jan. 22, 2018 in corresponding Korean Patent Application No. 10-2016-0147408 (2 pages in Korean).

* cited by examiner

*Primary Examiner* — Heather R Jones
(74) *Attorney, Agent, or Firm* — NSIP Law

(57) ABSTRACT

A network video recorder having a multi-stream recording function which is robust to event stream delay is provided. An event stream is recorded by adjusting a time-lapse recording end time and an event recording time to prevent omission of a video, caused by transmission delay of a high-quality event stream during the recording of the event stream.

5 Claims, 4 Drawing Sheets

NETWORK VIDEO RECORDER FOR MULTI-STREAM RECORDING ENHANCED EVENT STREAM DELAY PROBLEM

CROSS-REFERENCE TO RELATED APPLICATION(S)

This application claims priority from Korean Patent Application No. 10-2016-0147408, filed on Nov. 7, 2016, in the Korean Intellectual Property Office, the disclosure of which is incorporated herein by reference in its entirety.

BACKGROUND

1. Field

The following description relates to a multi-stream recording technique, and more particularly, to a network video recorder having a multi-stream recording function which is robust to event stream delay.

2. Description of Related Art

Korean Laid-Open Patent Publication No. 10-2007-0030017 (Mar. 15, 2007) discloses a technique for overlappingly setting different recording modes, such as motion-event stream recording, sensor-event stream recording, data-event stream recording, and a general recording mode, for the same time period, storing and managing the different recording modes using multi-scheduling recording mode information, selecting a recording mode corresponding to current time and whether an event occurs on the basis of the multi-scheduling recording mode information, and recording a camera image to have video-recording quality corresponding to the selected recording mode.

If a network video recorder (NVR) capable of performing low-quality time-lapse recording and high-quality event stream recording is implemented in a single-stream recording environment, recording may be performed by changing frames of the same stream to be event type frames when an event occurs during time-lapse recording.

Problems caused by transmission delay need not be considered in the single-stream recording environment, since event-stream recording and time-lapse recording are performed using one stream. Furthermore, even when an event occurs at a position of a reference frame during recording of compressed video, time-lapse recording and event-stream recording are performed using a single stream. Thus, a key frame of the reference frame may be reproduced by obtaining the key frame from data of a recorded time-lapse stream.

However, when the NVR capable of performing low-quality time-lapse recording and high-quality event stream recording is implemented in a multi-stream recording environment, time-lapse recording and event-stream recording are performed using different streams and overlapping recording and recording omission may occur due to transmission delay of an event stream.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a network video recorder having a multi-stream recording function which is robust to event stream delay, which is capable of controlling a time-lapse recording end time and an event recording time during recording of an event stream to prevent omission of a video, caused by transmission delay of a high-quality event stream during the recording of the event stream.

In one general aspect, a network video recorder having a multi-stream recording function which is robust to event stream delay includes a time-lapse recorder configured to continuously record a time-lapse stream set by a user for a time period set by the user in a time-lapse recording mode; an event recorder configured to record an event stream set by the user from a start point of a specific event set by the user to an end point of the specific event in an event recording mode; and a recording controller configured to control switching between the time-lapse recording mode and the event recording mode by sensing a start of the specific event and an end of the specific event, and adjust a time-lapse recording end time and an event recording time to prevent omission of a video, caused by transmission delay of the event stream during the recording of the event stream.

In one additional aspect, the recording controller may adjust the event recording time such that the recording of the event stream is started at a position of a key frame of the event stream in the event recording mode to prevent omission of a video in an overlapping recording section during reproduction of the event stream.

In another additional aspect, the recording controller may adjust the time-lapse recording end time such that the recording of the time-lapse stream is continued to the position of the key frame of the event stream to prevent omission of a video during the recording of the event stream, caused when the event stream is recorded starting from the position of the key frame in the event recording mode.

In another additional aspect, the recording controller may further adjust the time-lapse recording end time such that the recording of the time-lapse stream is continued to the end point of the specific event in the event recording mode to prevent omission of a video in a recording omission section during the recording of the event stream.

In another additional aspect, the recording controller may delete data of the time-lapse stream, which is redundantly recorded from the position of the key frame at which the recording of the event stream is started to an end of the recording of the event stream, to save space.

Other features and aspects will be apparent from the following detailed description, the drawings, and the claims.

Figure 1:
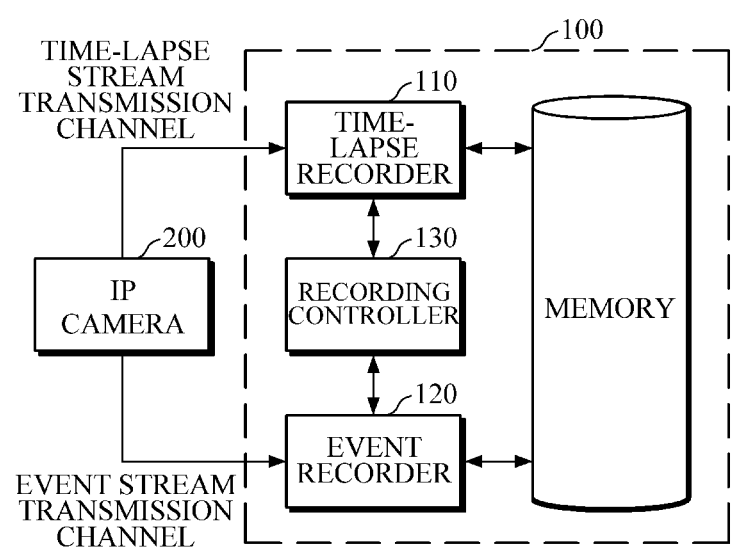
FIG. 1 is a block diagram of an example of a network video recorder having a multi-stream recording function which is robust to event stream delay.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments will be described in greater detail with reference to the accompanying drawings so that those of ordinary skill in the art can easily understand and implement them.

In the following description, well-known functions or constructions are not described in detail if it is determined that they would obscure the embodiments due to unnecessary detail.

The terms used in the following description are defined in consideration of functions of embodiments set forth herein and may be thus modified according to the intentions of users or operators, precedents, or the like. Thus, the terms used herein should be defined based on the whole context of the following description.

FIG. 1 is a block diagram of a network video recorder 100 having a multi-stream recording function which is robust to event stream delay, according to an embodiment. As illustrated in FIG. 1, the network video recorder 100 having a multi-stream recording function which is robust to event stream delay according to an embodiment includes a time-lapse recorder 110, an event recorder 120, and a recording controller 130.

In a time-lapse recording mode, the time-lapse recorder 110 continuously records a time-lapse stream which is set by a user for a time period which is set by the user.

For example, a video captured by at least one internet protocol (IP) camera 200 connected to the network video recorder 100 via a network may be converted into a low-quality time-lapse stream and the low-quality time-lapse stream may be then transmitted to the network video recorder 100 via a time-lapse stream transmission channel.

Then, the network video recorder 100 receiving the low-quality time-lapse stream may perform time-lapse stream recording by continuously storing the low-quality time-lapse stream in a memory bank for a time period, which is set by the user, through the time-lapse recorder 110 in the time-lapse recording mode. In this case, the memory bank may be dedicated to the recording of the time-lapse stream.

In an event recording mode, the event recorder 120 records an even stream set by a user from a start point of a specific event set by the user to an end point of the specific event.

For example, a video captured by the at least one IP camera 200 connected to the video recorder 100 via a network may be converted into a high-quality event stream and the high-quality event stream may be then transmitted to the network video recorder 100 via an event stream transmission channel.

Then, in the event recording mode, the network video recorder 100 receiving the high-quality event stream may perform event-stream recording by storing the high-quality event stream in the memory bank through the event recorder 120 from a start point of a specific event set by the user to an end point of the specific event. In this case, the memory bank may be dedicated to the recording of the event stream.

The recording controller 130 controls switching between the time-lapse recording mode and the event recording mode by sensing the occurrence of an event and an end of the event, and adjusts a time-lapse recording end time and an event recording time to prevent omission of a video, caused by transmission delay of the event stream during the recording of the event stream.

In this case, the recording controller 130 may be configured to sense the occurrence of an event by conducting a video analysis on the low-quality time-lapse stream video. For example, the occurrence of an event may be sensed when a motion of an object is detected in a video of the time-lapse stream, and the end of the event may be sensed when the motion of the object disappears in the video of the time-lapse stream after the occurrence of the event is sensed through the detection of the motion of the object.

Figure 2:
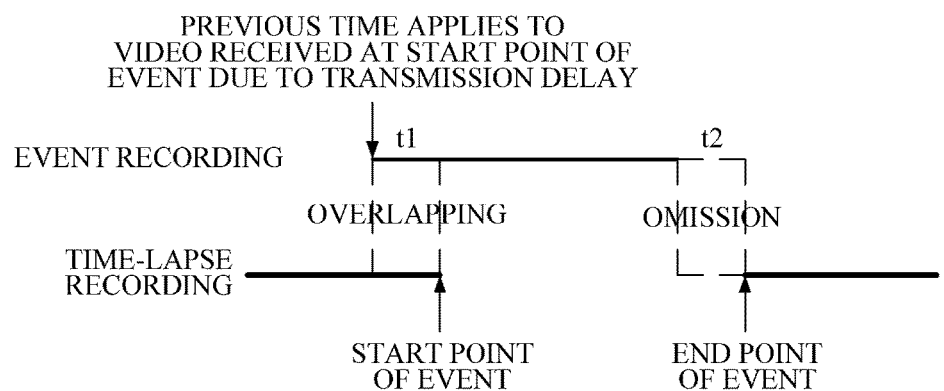
FIG. 2 is a diagram illustrating an overlapping recording section and a recording omission section when a time-lapse recording mode is switched to an event recording mode.

FIG. 2 is a diagram illustrating an overlapping recording section and a recording omission section when the time-lapse recording mode is switched to the event recording mode. When the occurrence of an event is sensed and thus the time-lapse recording mode is switched to the event recording mode, a time delay caused by transmission of a high-quality event stream occurs. The time delay caused by the transmission of the high-quality event stream depends on a network environment or the performance of a camera.

As illustrated in FIG. 2, a high-quality event stream transmitted to the network video recorder 100 from the at least one IP camera 200 after a start point of an event is a stream transmitted earlier than current time. Thus, an overlapping recording section of a time period t1 occurs, starting from the start point of the event. The overlapping recording section is a time section in which a time-lapse stream received in the time-lapse recording mode and an event stream received in the event recording mode overlap each other.

Since the high-quality event stream transmitted to the network video recorder 100 from the at least one IP camera 200 is a stream transmitted earlier than current time, a recording omission section of a time period t2 occurs before an end point of the event. The recording omission section is a time section in which recording of the event stream received in the event recording mode is omitted. In this case, the time periods t1 and t2 may be the same time interval.

The recording controller 130 adjusts an event recording time such that recording is started at a position of a key frame of the event stream in the event recording mode to prevent omission of a video in the overlapping recording section during reproduction of the event stream. Here, the key frame is a self-reproducible frame, e.g., an I-frame of a group of pictures (GOP).

When the recording of the event stream is started at a positon of a reference frame in the event recording mode, the event stream is not reproduced to a position of a subsequent key frame. Here, the reference frame is a frame which is not self-reproducible and can be reproduced with a key frame, and may be, for example, a B-frame or a P-frame of the GOP.

The recording controller 130 adjusts a time-lapse recording end time such that the time-lapse stream is continuously recorded to a position of a key frame of the event stream to prevent omission of a video, caused when the event stream is recorded starting from the position of the key frame in the event recording mode.

Figure 3:
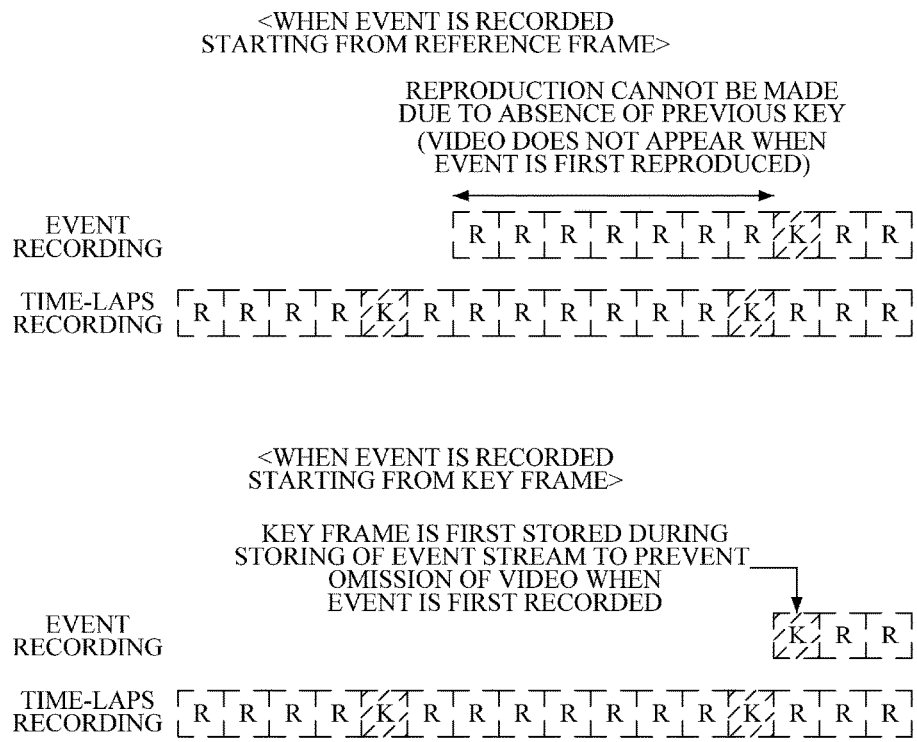
FIG. 3 is a diagram illustrating an example method of preventing omission of a video in an overlapping recording section, performed by a network video recorder having a multi-stream recording function which is robust to even stream delay.

FIG. 3 is a diagram illustrating a method of preventing omission of a video in an overlapping recording section, performed by a network video recorder having a multi-stream recording function which is robust to even stream delay, according to an embodiment.

When the event recording mode is started, the recording controller 130 adjusts a time-lapse recording end time to continue recording of a time-lapse stream during receiving of a reference frame (indicated by R in FIG. 3) and adjusts an event recording time to start recording of an event stream as soon as receiving a key frame (indicated by K in FIG. 3).

In this case, when video is reproduced from a start point of an event to an end point of the event, the video may be prevented from being omitted in the overlapping recording section by reproducing data of the recorded time-lapse stream before a point of a first key frame, starting from the start point of the event, and then reproducing data of the recorded event stream after the position of the first key frame.

To prevent a video from being omitted in a recording omission section during reproduction of the event stream, the recording controller 130 further adjusts the time-lapse recording end time to continue the recording of the time-lapse stream to the end point of the event in the event recording mode.

A high-quality event stream transmitted to the network video recorder 100 from the at least one IP camera 200 is a stream transmitted earlier than current time and thus a recording omission section of a time period t2 occurs before the end point of the event.

To prevent omission of a video in the recording omission section, the recording controller 130 may continue the recording of the time-lapse stream to the end point of the event so that the recorded time-lapse stream may be reproduced during reproduction of the video in the recording omission section. Although the quality of video of the recorded time-lapse stream is lower than that of video of the recorded event-stream, a fatal problem such as omission of a video may be avoided.

Furthermore, the recording controller 130 deletes data of the time-lapse stream, which is redundantly recorded from a position of a key frame at which the recording of the event stream is started to an end point of the recording of the event stream, to save space. When time-lapse recording is continued during the event recording mode, data of the recorded time-lapse stream and data of the recorded event stream overlap each other from the position of key frame at which the recording of the event stream is started to a start position of the recording omission section. Thus, the data of the time-lapse stream recorded from the position of key frame at which the recording of the event stream is started to the start position of the recording omission section may be deleted to prevent waste of a memory. In this case, the data of the recorded event stream is first reproduced in the overlapping recording section.

Figure 4:
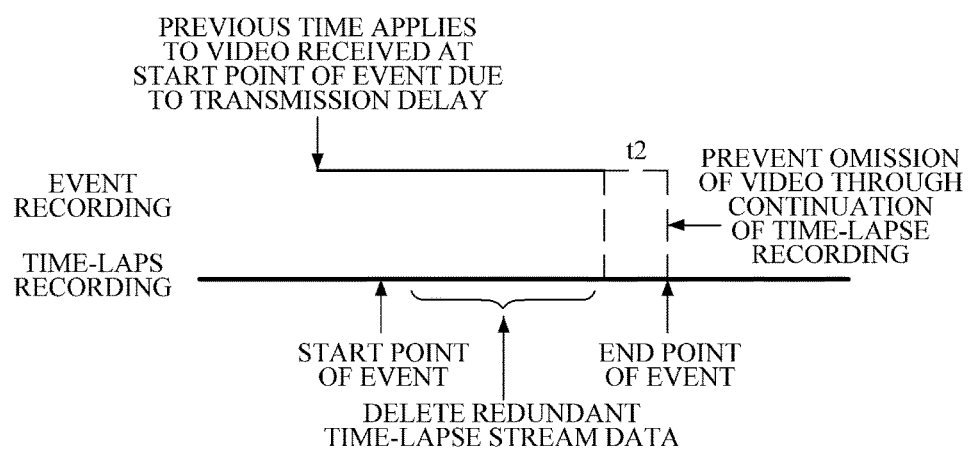
FIG. 4 is a diagram illustrating an example method of preventing omission of a video in a recording omission section, performed by a network video recorder having a multi-stream recording function which is robust to even stream delay.

FIG. 4 is a diagram illustrating a method of preventing a video from being omitted in a recording omission section, performed by a network video recorder having a multi-stream recording function which is robust to even stream delay, according to an embodiment.

A high-quality event stream transmitted to the network video recorder 100 from the at least one IP camera 200 is a stream transmitted earlier than current time and thus an recording omission section of a time period t2 occurs before an end point of an event.

To prevent omission of a video in the recording omission section, the recording controller 130 continues recording of a time-lapse stream to the end point of the event so that the recorded time-lapse stream may be reproduced during reproduction of video in the recording omission section.

Furthermore, the recording controller 130 may delete data of the time-lapse stream recorded from a position of a key frame at which recording of an event stream is started to a start position of the recording omission section. Accordingly, data of the time-lapse stream recorded in an overlapping recording section, caused by time-lapse recording continued during the event recording mode, may be deleted to prevent waste of a memory.

Accordingly, according to an embodiment, an event stream is recorded by adjusting a time-lapse recording end time and an event recording time during the recording of the event stream and thus omission of a video, caused by transmission delay of a high-quality event stream during the recording of the event stream, may be prevented.

While exemplary embodiments have been described above with reference to the accompanying drawings, it would be apparent to those of ordinary skill in the art that various modifications may be made in the embodiments on the basis of the above description without departing from the scope of the inventive concept defined in the following claims.

What is claimed is:

1. A network video recorder having a multi-stream recording function which is robust to event stream delay, the network video recorder comprising:
    a time-lapse recorder configured to continuously record a time-lapse stream set by a user for a time period set by the user in a time-lapse recording mode;
    an event recorder configured to record an event stream set by the user from a start point of a specific event set by the user to an end point of the specific event in an event recording mode; and
    a recording controller configured to control switching between the time-lapse recording mode and the event recording mode by sensing a start of the specific event and an end of the specific event, and adjust a time-lapse recording end time and an event recording time to prevent omission of a video, caused by transmission delay of the event stream during the recording of the event stream.

2. The network video recorder of claim 1, wherein the recording controller adjusts the event recording time such that the recording of the event stream is started at a position of a key frame of the event stream in the event recording mode to prevent omission of a video in an overlapping recording section during reproduction of the event stream.

3. The network video recorder of claim 2, wherein the recording controller adjusts the time-lapse recording end time such that the recording of the time-lapse stream is continued to the position of the key frame of the event stream to prevent omission of a video during the recording of the event stream, caused when the event stream is recorded starting from the position of the key frame in the event recording mode.

4. The network video recorder of claim 3, wherein the recording controller further adjusts the time-lapse recording end time such that the recording of the time-lapse stream is continued to the end point of the specific event in the event recording mode to prevent omission of a video in a recording omission section during the recording of the event stream.

5. The network video recorder of claim 4, wherein the recording controller deletes data of the time-lapse stream, which is redundantly recorded from the position of the key frame at which the recording of the event stream is started to an end of the recording of the event stream, to save space.

* * * * *